(12) United States Patent
Sirer et al.

(10) Patent No.: US 9,317,536 B2
(45) Date of Patent: Apr. 19, 2016

(54) SYSTEM AND METHODS FOR MAPPING AND SEARCHING OBJECTS IN MULTIDIMENSIONAL SPACE

(75) Inventors: Emin Gun Sirer, Ithaca, NY (US);
Nicole L. Caruso, Ithaca, NY (US);
Karen Caruso, legal representative, Ithaca, NY (US); Bernard Wong, Kitchener, CA (US); Robert Escriva, Macedon, NY (US)

(73) Assignee: Cornell University, Ithaca, NY (US)

(*) Notice: Subject to any disclaimer, the term of this patent is extended or adjusted under 35 U.S.C. 154(b) by 174 days.

(21) Appl. No.: 13/643,799

(22) PCT Filed: Apr. 27, 2011
(Under 37 CFR 1.47)

(86) PCT No.: PCT/US2011/034192
§ 371 (c)(1),
(2), (4) Date: Dec. 20, 2012

(87) PCT Pub. No.: WO2011/137189
PCT Pub. Date: Nov. 3, 2011

(65) Prior Publication Data
US 2013/0138646 A1    May 30, 2013

Related U.S. Application Data

(60) Provisional application No. 61/328,458, filed on Apr. 27, 2010.

(51) Int. Cl.
*G06F 17/30* (2006.01)

(52) U.S. Cl.
CPC .... *G06F 17/30283* (2013.01); *G06F 17/30545* (2013.01)

(58) Field of Classification Search
CPC ................. G06F 17/30283; G06F 17/30592
USPC ........... 707/E17.056, 957, 958, 961, 962, 770
See application file for complete search history.

(56) References Cited

U.S. PATENT DOCUMENTS

| | | | |
|---|---|---|---|
| 5,661,773 A | 8/1997 | Swerdloff et al. | |
| 6,282,540 B1 | 8/2001 | Goldensher et al. | |
| 6,460,026 B1 * | 10/2002 | Pasumansky | 707/737 |
| 6,744,846 B2 | 6/2004 | Popescu et al. | |
| 6,744,923 B1 | 6/2004 | Zabih et al. | |
| 7,212,201 B1 | 5/2007 | Geiger et al. | |
| 7,389,283 B2 | 6/2008 | Adler | |

(Continued)

OTHER PUBLICATIONS

"Dynamo: Amazon's highly available key-value store" by DeCandia et al. Oct. 14-17, 2007.*

(Continued)

*Primary Examiner* — Miranda Huang
(74) *Attorney, Agent, or Firm* — Valauskas Corder LLC (57) ABSTRACT

This invention relates to a system and methods for determining the placement of an object in a distributed key-value store by mapping the object to nodes in multidimensional hyperspace. A search function supports efficient object retrieval, even when the search query requests multiple objects and specifies them through non-primary keys. In response to a search query, the search is translated into hyperregions in the hyperspace to determine the set of nodes that hold the queried data object. The number of contacted nodes and the number of scanned objects are significantly reduced in comparison to prior art techniques.

5 Claims, 6 Drawing Sheets

(56) References Cited

U.S. PATENT DOCUMENTS

| | | | |
|---|---|---|---|
| 7,627,079 B2 | 12/2009 | Boone | |
| 2006/0106762 A1* | 5/2006 | Caracas et al. | 707/3 |
| 2006/0129529 A1* | 6/2006 | Adler | 707/3 |
| 2006/0259282 A1 | 11/2006 | Failla et al. | |
| 2010/0042645 A1* | 2/2010 | Bakalash et al. | 707/102 |
| 2010/0082654 A1* | 4/2010 | Zhang et al. | 707/759 |
| 2010/0241629 A1* | 9/2010 | Tatemura et al. | 707/741 |

OTHER PUBLICATIONS

Cook et al., Automated Extraction of Radiation Dose Information for CT Examinations; J Am Coll Radiol 7:871-877, Nov. 2010.

Clunie, CoreLab Partners, Inc., Extracting, Managing and Rendering DICOM Radiation Dose Information from Legacy & Contemporary CT Modalities; published Oct. 2010; source code published May 31, 2010: http://www.dclunie.com/pixelmed/software/webstart/DoseUtilityUsage.html.

Jacobs et al., Automated patient dose evaluation for pediatric CT, published Mar. 2011.

Mueller et al., Automated Object Extraction for Medical Image Retrieval Using the Insight Toolkit (ITK), Third Asia Information Retrieval Symposium AIRS 2006, pp. 476-488, Singapore, Oct. 16-18, 2006.

Devin et al., Automated Detection and Supervised Removal of Protected Health Information Embedded in DICOM Images: Development of Technology and User-Interface Incorporated into Research Workflow, Radiological Society of North America (RSNA) Conference, Chicago, Illinois, Dec. 2009.

* cited by examiner

SYSTEM AND METHODS FOR MAPPING AND SEARCHING OBJECTS IN MULTIDIMENSIONAL SPACE

FIELD OF THE INVENTION

The invention relates generally to distributed computing environments, and particularly to a distributed key-value store that stores multi-attribute objects and enables quick and efficient lookup by any attribute.

BACKGROUND OF THE INVENTION

Storing and retrieving data is a critical operation for many software applications. For example, software applications such as web services and scientific computations often need to store data and retrieve it later. Such data is often structured to conform to a rigid schema such as the names and types of attributes common to the data. Data may also be semi-structured in that the data does not conform to a rigid schema but nonetheless contains tags or other markers to separate attribute values. Furthermore, data may be unstructured wherein the data lacks attributes entirely.

The advent of distributed computing environments such as cloud computing systems has opened new possibilities for the rapid and scalable deployment of data storage and retrieval systems. In general, a distributed computing environment deploys a set of hosted resource servers that can be combined or strung together to perform coordinated tasks. For example, one group of resource servers can be configured to accept and service requests from web clients, known as front-end servers. A further group of resource servers can be configured to serve as a data store to provide data storage and retrieval services to the front-end servers. Other types of resource servers are also possible.

A user or customer can request the instantiation of a virtual machine or set of machines from those resources from a central server or management system to perform intended tasks or applications. The user can lease or subscribe to the set of instantiated virtual machines for their intended application. For example, a user may wish to set up and instantiate a virtual server from the distributed computing environment to create a storefront for products or services on a temporary basis.

In addition to distributed architectures, distributed applications may be deployed natively across one or more datacenters. Instead of using the hosted resource servers provided by an operator of a distributed architecture, a user may choose to deploy their software natively on dedicated hardware.

Regardless of whether a distributed architecture is used to deploy a distributed application or whether the distributed application is deployed natively across one or more datacenters, many current applications require quick storage, indexing and retrieval of structured and semi-structured data. These services are typically provided by one or more servers known as the backing store.

In the past, traditional relational databases have been used predominantly as the backing store for data intensive applications. Relational databases typically support very general mechanisms for querying the data store. The term "query" refers to the process of retrieving all objects whose attribute values match a specified set of values. While relational databases enable users to retrieve objects by querying for any of their attributes, this generality comes at the expense of higher overheads. Relational databases entail large overheads and have difficulty scaling up.

Key-value stores provide an alternative to relational databases for the storage and retrieval of data. A key-value store—also known as an associative array, object store—comprises a set of keys and a set of values where each key corresponds to one or more values. The term "lookup" refers to the process of finding the one or more values associated with a key. Key-value stores provide a very efficient lookup operation, but such efficiency typically comes at the cost of reducing the interface to lookup operations. Specifically, whereas traditional databases enable querying objects by any attribute value, key-value stores typically enable clients to lookup the data solely by the single key under which it was inserted into the database. This restriction to a single key helps improve performance and scalability significantly, but fails to support applications that need to recall objects by attribute values other than the primary key. Furthermore, queries based on non-primary attributes are typically forced to enumerate all objects of a given type. Current key-value stores do not support an efficient search function.

Thus, there is a need for a distributed key-value store that supports mapping data objects to support an efficient search function, specifically a search on any combination of attributes (primary and non-primary) of the data object. The present invention satisfies this demand.

SUMMARY OF THE INVENTION

The present invention is directed to a system and methods for mapping multi-attribute objects in a distributed key-value store within a distributed computing environment such that the objects can be retrieved by searching one or more attributes of the object according to a search function. Each object—also referred to herein as "data" or "data object"—includes at least one attribute. For purposes of this application, the terms "attribute" and "key" are used interchangeably herein. The invention herein focuses on the storage and retrieval of structured and semi-structured data. As mentioned above, structured data objects conform to a rigid schema of attributes common to the data and semi-structured data objects conform to an inconsistent schema of attributes.

More specifically, the present invention supports key-value stores with homogenous objects and non-homogenous objects. Homogenous objects of a key-value store all conform to the same attribute schema such as first name, last name and telephone number. Non-homogenous objects have differing attribute schema. For example, the key-value store may include two objects with different attributes schema such that a first object has an attribute schema of first name, last name and telephone number and a second object has an attribute schema of first name, last name and address. In the preferred embodiment, the dimensions of the hyperspace consist of the union of all distinct object attributes such that the position of an object in the hyperspace is specified by its attributes. For dimensions representing attributes that are not specified by the object such in the case of a non-homogeneous object in a key-value store, the object coordinate includes a random value such as that assigned to the unspecified dimensions of the object.

A mapping technique determines object placement in a distributed key-value store. Specifically, objects are placed in a multi-dimensional Euclidean space referred to herein as "n-dimensional space" or "hyperspace". More specifically, the hyperspace is divided into hyperspace regions also referred to herein as hyperregions. Each hyperregion comprises a bounded polytope of the same dimensionality as the hyperspace. Each hyperregion is assigned to data storage nodes, also referred to herein as nodes.

Objects are assigned coordinates within the hyperspace, wherein the coordinates are derived from the attribute values of that object. In one embodiment, each object is then stored at the data storage node whose hyperspace region encapsulates the coordinates assigned to that object. Thus, the mapping provides an assignment of data objects to nodes based on the attribute values of that object. The collection of data objects including attributes is stored on data storage nodes of a distributed computing environment to provide the distributed key-value store.

A node or data storage node may be any computing element located in any network. For example, a node may be a server within a distributed computing environment. More specifically, a node may be a virtual machine that resides in a cloud computing environment. The nodes may be distributed across multiple physical locations in the distributed computing environment, for example, a combination of servers on the Internet, servers on intranets, servers on extranets, routers, and clients.

In the preferred embodiment, membership of data storage nodes in the key-value store, as well as the assignment of hyperspace regions to each of the data storage nodes, is managed by a coordinator alogorithm—otherwise referred to herein simply as coordinator. The coordinator algorithm may be centralized or de-centralized. During initialization, the coordinator algorithm determines the number of nodes to distribute such as along each axis of a hyperregion. A denser distribution along a particular axis may help reduce the number of objects per node, thus expediting searches on that attribute. Once the coordinator has determined the hyperspace and assigned hyperspace regions to nodes, the object-to-node mapping can be determined by any client without contacting the coordinator. Furthermore, since the distribution of the nodes in the space is managed by the coordinator, the position of nodes can be relocated in order to respond to changes in the dimensionality of the hyperspace. In another embodiment, the system may utilize distributed coordination algorithms for performing the assignment of hyperspace regions to nodes.

In one embodiment, the hyperspace regions assigned to each node is a hypercube, though other embodiments that assign differently sized hyperspace regions are possible as well. Furthermore, the distribution and arrangement of the hyperspace regions assigned to data storage nodes may be a uniform grid in the preferred embodiment, though other assignment strategies, such as random assignment or adaptive assignment algorithms for varying the hyperspace region size to achieve load balancing, are also possible.

The coordinates for an object are computed based on the attribute values of that object. In one embodiment, the coordinate is computed by taking the hash of its attribute values. Such a hash-based approach can distribute the objects throughout the data storage nodes according to the distribution properties of the hash function's output. If a random hash function is used, the resulting objects will be distributed uniformly across the data storage nodes, with predictably uniform load-balancing properties for the resultant key-value store. In another embodiment, an order preserving function based on the attribute values may be used. Such a function permits the system to support range queries on the key-value store. Therefore, objects in the key-value store are identified by coordinates computed from their attribute values. The data storage node whose hyperspace region encapsulates the object coordinates is referred to as the home node. For fault tolerance purposes, data storage nodes may be assigned overlapping hyperspace regions, in which case an object might be assigned to a plurality of home nodes. In these cases, the object is effectively replicated, and the key-value store is capable of tolerating failures depending on the degree of replication. Once the home node set is identified, the object is assigned to the at least one home node. Specifically, an insert operation is forwarded to a home node to store the object. The object may be stored in a local key-value store on the home node. It is also contemplated that the object may be updated or deleted at the home node as determined by hashing the object. A delete operation follows the same steps to identify the home node, that is, the object's coordinate is computed and a node is identified that is responsible for the hyperspace region that encompasses the object's position. The home node then reviews the local key-value store for the object and removes the object.

In one embodiment, the data storage nodes store the objects in their hyperspace region in main memory. In another embodiment, the data storage nodes store objects on memory as well as secondary storage media, such as one or more disks. In this embodiment, each data storage node organizes its plurality of disks into separate partitions, each of which is assigned a subregion of the hyperspace region assigned to that data storage node. Each object is thus stored in a separate partition based on the mapping from its coordinates to the appropriate enclosing subregion assigned to that partition. To facilitate faster lookups, a fixed size bloom filter may be associated with each partition. A bloom filter is used to determine whether a queried object is within the block. For an object insert operation, the object is inserted into a non-full block, and each component i of the object's coordinate is hashed i times and inserted into the bloom filter associated with the block. Hashing each coordinate component separately enables partial coordinate matching necessary in object search. For an object delete operation, the object is removed from the block but the bloom filter is not updated. The bloom filter is instead periodically regenerated from scratch to remove old references to objects.

The number of bloom filter checks is reduced by building a bloom filter tree. A coordinate search traverses from the root bloom filter down to the leaf bloom filters, pruning branches that cannot include the search coordinate. This reduces the number of bloom filter checks for each coordinate to approximately $O(\log b)$ given b blocks. The bloom filters are stored separately from the data objects in order to reduce the number of disk operations while traversing the bloom filter tree.

The object-to-node mapping within the hyperspace occurs real-time. According to the present invention, the key-value store is dynamic and changes when new objects are inserted into the hyperspace, when new nodes are added to the hyperspace, and when nodes fail. Since a region of the hyperspace is assigned to every node, nodes are responsible for objects whose coordinates lie within the hyperspace region of each node.

Mapping the object to a node allows efficient object retrieval when a search query is initiated. The search query is deployed within the distributed computing environment versus memory access on a single machine. Furthermore, the nodes to which the object and its attributes are mapped possess a flat layout across the distributed computing environment versus the typical hierarchical tree structures requiring traversal. A search query may request one or more objects by specifying the one or more primary attributes or non-primary attributes.

The hyperspace is leveraged to efficiently resolve queries. A query containing a partially specified attribute corresponds to a region of hyperspace—or hyperregion—in which the sought objects lie, and all of the nodes are efficiently determined that may be holding objects of interest. Instead of enumerating all objects, only the nodes whose hyperspace regions intersect the hyperregion need to be contacted, improving search complexity. Search complexity is improved from O(N), where N is the number of server nodes in the key-value store, to $O(N^{(d-q/d)})$ (for an equilateral node distribution), where d is the number of object attributes and q is the number of attribute values specified in the query. When the search is fully-qualified—a situation analogous to object retrieval with a primary key or primary attribute in traditional relational databases—the search is performed via a single lookup. The present invention significantly reduces the number of contacted nodes and the number of scanned objects.

A typical search query specifies attributes as values. The search query may consist of a set of attribute values or a portion of the set. The search query correlates the set of attribute values or the portion of the set to a corresponding "query hyperregion" within the hyperspace. The objects that match the query reside in this query hyperregion. Therefore, only the set of nodes that intersects the query hyperregion need to be scanned for the object. Nodes whose hyperspace regions do not intersect the query hyperregion can be safely excluded from the evaluation, as they contain only objects whose attribute values are not in common with the search query.

Specifically, a search query specifying Q attribute values defines (D−Q)-dimensional query hyperregion. This query hyperregion is the intersection of Q (D−1)-dimensional hyperregions, where each (D−1)-dimensional hyperregion has an intercept on its axis at the specified attribute value. The intersection of these hyperregions contains the zero or more objects of interest.

The present invention also supports range queries such that a range of attributes may be specified. Range queries are supported by coordinates that are computed using an order-preserving hash function. For example, the coordinates of the range end-points of a range query are computed, and the query hyperregion is extended to span the entire region between the end-points.

In one embodiment, to provide availability and persistence guarantees in the event of failures, objects are mapped to a plurality of home nodes. Every object is stored on the plurality of home nodes whose hyperspace regions encapsulate the coordinates of that object. When a home node fails, the coordinator or the distributed coordination algorithm responds by reassigning the hyperspace region of the failed node to a backup node, and updating the mapping function used by clients. When the node goes back online, it can recover its new state from the backup. This failover minimizes data motion through failures, as it confines object migration to the hyperspace region of the failed node.

In such cases where an object is mapped to a plurality of home nodes, object updates may need to be coordinated such that lookups retrieve the latest version of the object from a designated home node that has the latest version. One technique for achieving this is to ensure that there is strict consistency among the plurality of home nodes by distributed coordination algorithms such as Paxos or vector clocks. However, since strict consistency using distributed coordination entails high overheads, another technique is to arrange the plurality of home nodes into a linear chain, and to propagate the changes from the head of the chain to the tail. An update that has reached the tail of the chain is considered fully committed. Lookups are sent to the tail of the chain, and always return the latest committed version of the object.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

DETAILED DESCRIPTION OF THE PREFERRED EMBODIMENT

Figure 1:
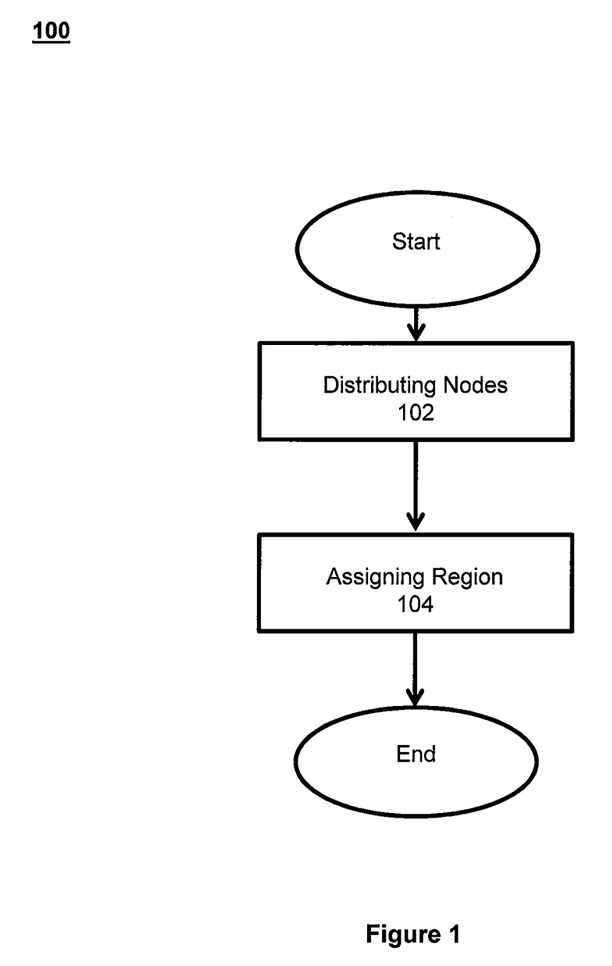
FIG. 1 illustrates a flow chart for node coordinate assignment according to one embodiment of the present invention.

Objects are mapped to one or more data storage nodes for placement in a distributed key-value store. FIG. 1 illustrates a flow chart for node coordinate assignment 100 according to one embodiment of the present invention. As shown by step 102, data storage nodes are distributed in hyperspace. A region of the hyperspace, or hyperregion, is assigned to each data storage node according to step 104. Each data storage node is responsible for one or more data objects that fall into the assigned region. The region of n-dimensional space assigned to each of the data storage node may overlap such that the data object is mapped to multiple, redundant home nodes. In one embodiment, the multiple, redundant home nodes are organized in a linear chain. The operation instruction is then mapped to the head of the linear chain and forwarded to each of the data storage node along the linear chain in the order determined by the linear chain. The region of n-dimensional space assigned to each of the data storage node may also be performed by a coordinator algorithm, which may be centralized or de-centralized. The coordinator algorithm may also maintain a membership list of the plurality of data storage nodes. The coordinator algorithm may uniformly distribute or randomly distribute the data storage nodes within the hyperspace.

Figure 2:
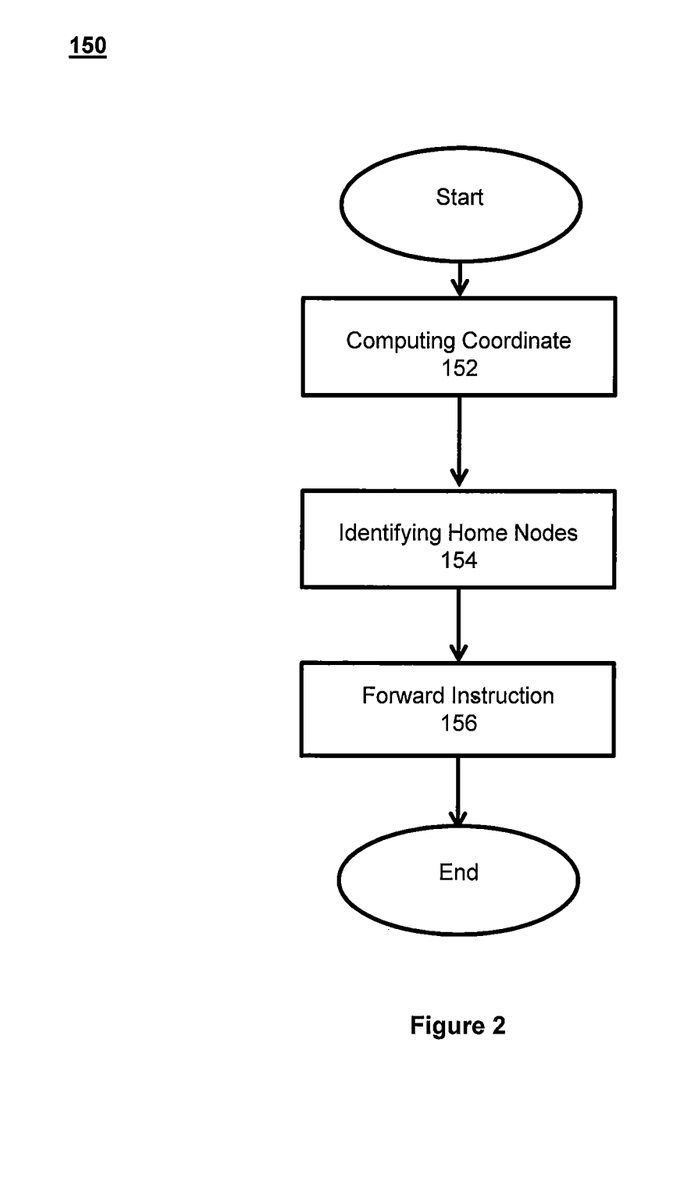
FIG. 2 illustrates a flow chart for data object insertion according to one embodiment of the present invention.

FIG. 2 illustrates a flow chart for data object insertion 150 according to one embodiment of the present invention. As shown by step 152, a coordinate of each data object is computed from one or more attribute values of the data object. The coordinate may be computed by hashing the one or more attribute values of the data object or by calculating an order-preserving function of the one or more attribute values of the data object. For example, attribute values of an object are hashed to define an x, y, z coordinate wherein each attribute of the object corresponds to each dimension. At step 154 a home node is identified that corresponds to the coordinate of each data object. It is contemplated that more than one home node may be identified that corresponds to the coordinate of each data object. An operation instruction is then forwarded to the home node. The operation instruction may be to store the data object at the home node, delete the data object from the home node, or modify the data object at the home node. Other operation instructions are also contemplated such as comparing and swapping data objects.

Each data storage node may store one or more data objects on persistent local storage. The persistent local storage may be divided into a plurality of partitions, each partition responsible for a subregion of the region of n-dimensional space assigned to each data storage node. The data object is stored on the partition that contains the coordinate of the data object.

Figure 3:
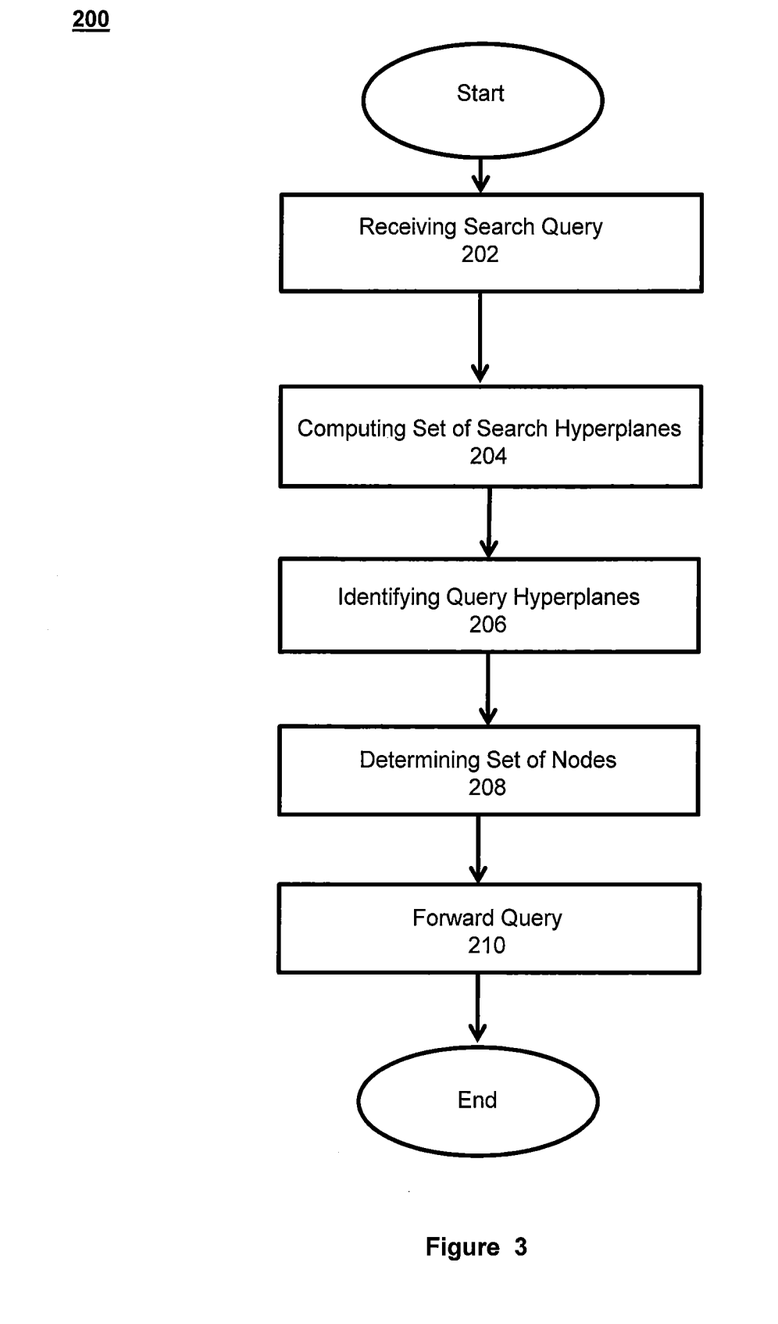
FIG. 3 illustrates a flow chart for searching an object of a key-value database according to one embodiment of the present invention.

FIG. 3 illustrates a flow chart for searching an object of a key-value database 200 according to one embodiment of the present invention. An object is searched within a key-value store from a search query that specifies at least one attribute value as shown by step 202. A set of search hyperregions corresponding to the at least one attribute value is computed at step 204. A query hyperregion is identified at step 206. The query hyperregion is defined by the intersection of one or more search hyperregions from the set of search hyperregions. As shown by step 208, a set of data storage nodes is determined whose assigned hyperspace regions intersect the query hyperregion to obtain a selected subset of data storage nodes. At step 210, the query is then forwarded to the selected subset of data storage nodes to determine and retrieve one or more data objects that correspond to the search query.

A search query specifying Q attribute values defines (D−Q)-dimensional hyperregions that is the intersection of Q (D−1)-dimensional hyperregions where each (D−1)-dimensional hyperregion has an intercept on an axis at the Q attribute values. The query hyperregion is scanned for a node that corresponds to the specified attribute value to obtain a selected node. The number of nodes contacted may be defined as $N^{(d-q)/d}$ when the nodes are uniformly distributed across the distributed computing environment.

Figure 4:
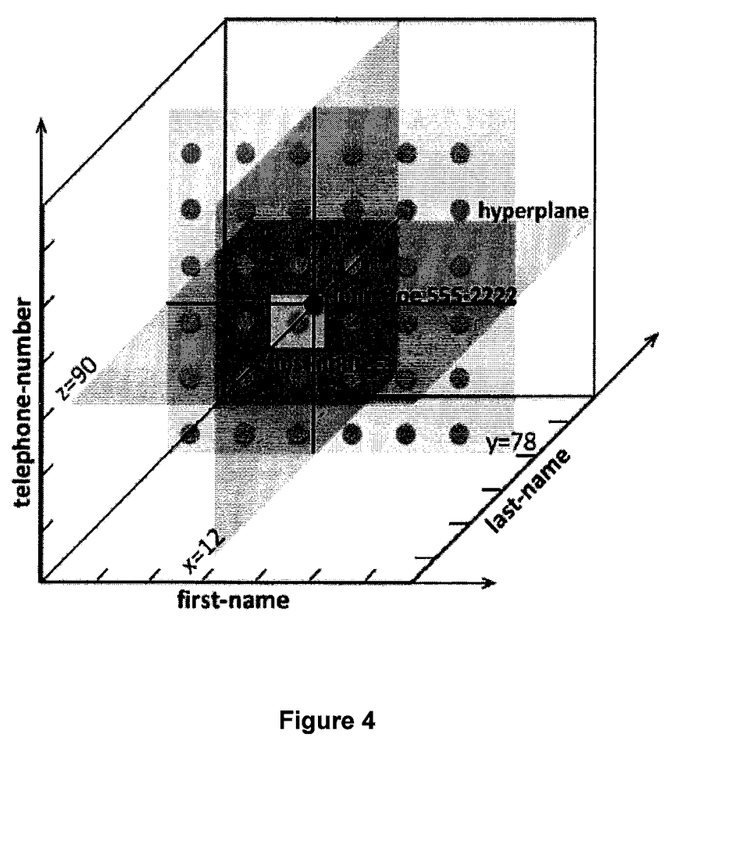
FIG. 4 illustrates a hyperspace with three dimensions (D=3) including a data object according to one embodiment of the present invention.

FIG. 4 illustrates a hyperspace with three dimensions (D=3) including a data object according to one embodiment of the present invention. For discussion purposes, a homogeneous key-value store is considered where all data objects conform to the same schema. As shown in FIG. 4, the hyperspace includes three dimensions and the object has three attributes: first-name, last-name, and telephone-number. In the example where the object is "John Doe 555-1234", the object is hashed to an index relating to an x-y-z coordinate. Specifically, the object "John Doe 555-1234" hashes to <12, 78, 90>. Each attribute of the object is assigned to a dimension, wherein the dimension is identified by an axis. For example, the first-name attribute is assigned to the x-dimension or x-axis at coordinate 12 including a surrounding region or x-hyperregion, the last-name attribute is assigned to the y-axis at coordinate 78 including a surrounding region or y-hyperregion, and the telephone-number attribute is assigned to the z-axis at coordinate 90 including a surrounding region or z-hyperregion. It should be noted that an attribute may be assigned to any dimension and further may be assigned to more than one dimension. Therefore, the object is stored in hyperspace at the node where all three hyperregions of the coordinate <12, 78, 90> intersect, otherwise referred to as the zero-dimensional intersection.

Therefore, a query for John Doe, would correspond to the hyperregion <12, 78, 0> and the nodes that lie closest to this coordinate will contain the object "John Doe 555-1234".

Given a search query, a node generates the query's corresponding query hyperregion. This hyperregion runs perpendicular to the axes that represent a query's attributes. Due to the static grid layout, the nodes can be grouped into a series of hyperregions that are parallel to the query hyperregion. The static grid lay out of nodes provides predictable performance and significantly simplifies the search protocol. The search query is sent to the nodes in the closest hyperregion to the search plane referred to herein as the "query hyperregion", which may contain coordinates that are on the query hyperregion. Each node performs the search locally, and the union of the results contains the complete set of objects that match the search query. If a hole exists in the closest hyperregion of nodes to the query hyperregion, the node in the same position as the hole in the next closest hyperregion is used in its place.

Search queries that specify a greater number of attributes result in improved lookup performance. The more attributes defined in the search query, the lower the dimensionality of the associated hyperregion. The intersection of additional query attributes reduces the size of the hyperregion, thereby limiting the number of neighboring nodes.

The following lists notation for dimensions, nodes and data objects:

| | Dimensions |
|---|---|
| $d_i$ | dimension i |
| $\vec{d} = \{d_0, d_1, \ldots\}$ | dimensions in system |
| $D = |\vec{d}|$ | # of dimensions in system |
| $\vec{q} = \{q_0, q_1, \ldots\}$ | dimensions in query |
| $Q = |\vec{q}|$ | # of dimensions in query |
| | Nodes |
| N | total # of nodes in system |
| $n_d i$ | # of nodes spanning $d_i$ |
| $\vec{n_d} = \{n_d 0, n_d 1, \ldots\}$ | node quantities in $\vec{d}$ |
| $\vec{n_q} = \{n_q 0, n_q 1, \ldots\}$ | node quantities in $\vec{q}$ |
| | data objects |
| r | total # of data objects |
| $r_n = r/\Pi_{i \in \vec{d}} n_d i$ | avg # of data objects per node |

For every specified attribute $q_i \in \vec{q}$, the number of nodes to scan decreases by $$\frac{1}{n_{qi}}.$$

Search queries according to the present invention reduce the number of relevant nodes to the ratio of the space covered by $\Pi_{i \in \vec{q}} n_{qi}$ and the space covered by $\Pi_{i \in \vec{d}} n_{di}$. The number of nodes to contact is given by:

$$\text{nodes} = \frac{\prod_{i \in \vec{d}} n_{di}}{\prod_{i \in \vec{q}} n_{qi}}$$

Correspondingly, the number of data objects to scan is given by:

$$dataobjects = O\left(r_n \frac{\prod_{i \in \vec{d}} n_{di}}{\prod_{i \in \vec{q}} n_{qi}}\right)$$

To illustrate, consider a system with D=4, $\vec{n_d}=\{n_{d0}, n_{d1}, n_{d2}, n_{d3}\}$ and $\vec{n_q}=\{n_{q0}, n_{q2}\}$. The search scope in this case reduces to $n_{d1}n_{d3}$ nodes and $O(r_n n_{d1} n_{d3})$ data objects. For a uniform distribution of nodes, $O(N^{(d-q)/d})$ node contacts are required.

There is no strict requirement regarding the number of nodes that each dimension must span. The coordinator can optimize the efficiency of searches by increasing the concentration of nodes across dimensions that are more likely to appear in queries. By packing nodes more tightly in a dimension $d_i$ with high search frequency, the average number of nodes that may contain data objects on the query hyperregion is significantly reduced. In addition, the number of data objects across $d_i$ for which each node are responsible decreases. Thus, queries that define the attribute associated with $d_i$ can more drastically reduce the number of contacted nodes and scanned data objects.

Figure 5:
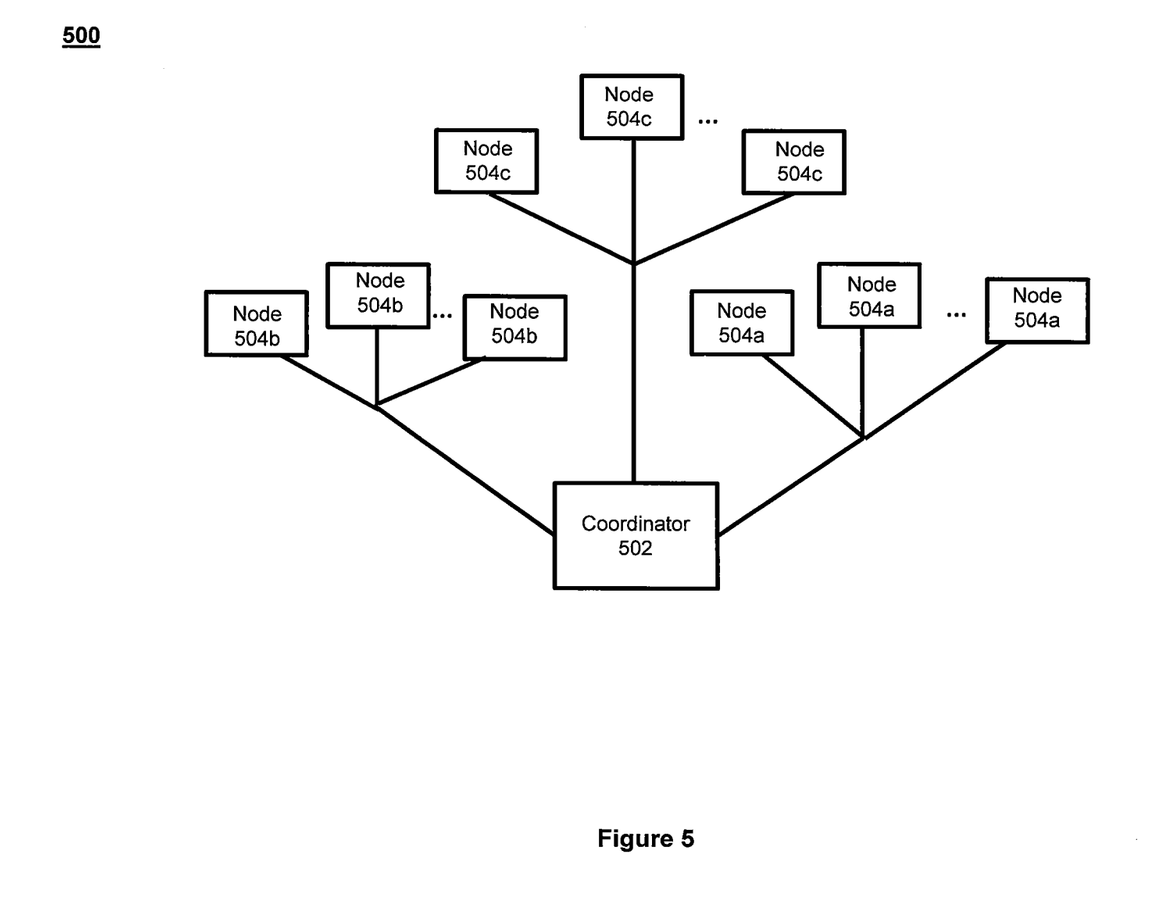
FIG. 5 illustrates a coordinator algorithm according to one embodiment of the present invention.

Membership of data storage nodes in the key-value store, as well as the assignment of hyperspace regions to each of the data storage nodes, is managed by a coordinator algorithm. FIG. 5 illustrates a coordinator algorithm according to one embodiment of the present invention. The coordinator algorithm 502 may be centralized or de-centralized. During initialization, the coordinator algorithm 502 determines the number of nodes 504 to distribute such as along each axis of a hyperregion. A denser distribution along a particular axis may help reduce the number of objects per node 504, thus expediting searches on that attribute. Once the coordinator has determined the hyperspace and assigned hyperspace regions to nodes 504, the object-to-node mapping can be determined by any client without contacting the coordinator 502. Furthermore, since the distribution of the nodes 504 in the space is managed by the coordinator 502, the position of nodes 504 can be relocated in order to respond to changes in the dimensionality of the hyperspace. In another embodiment, the system may utilize distributed coordination algorithms for performing the assignment of hyperspace regions to nodes.

A node or data storage node may be any computing element located in any network. For example, a node may be a server within a distributed computing environment. More specifically, a node may be a virtual machine that resides in a cloud computing environment. The nodes may be distributed across multiple physical locations in the distributed computing environment, for example, a combination of servers on the Internet, servers on intranets, servers on extranets, routers, and clients.

Figure 6:
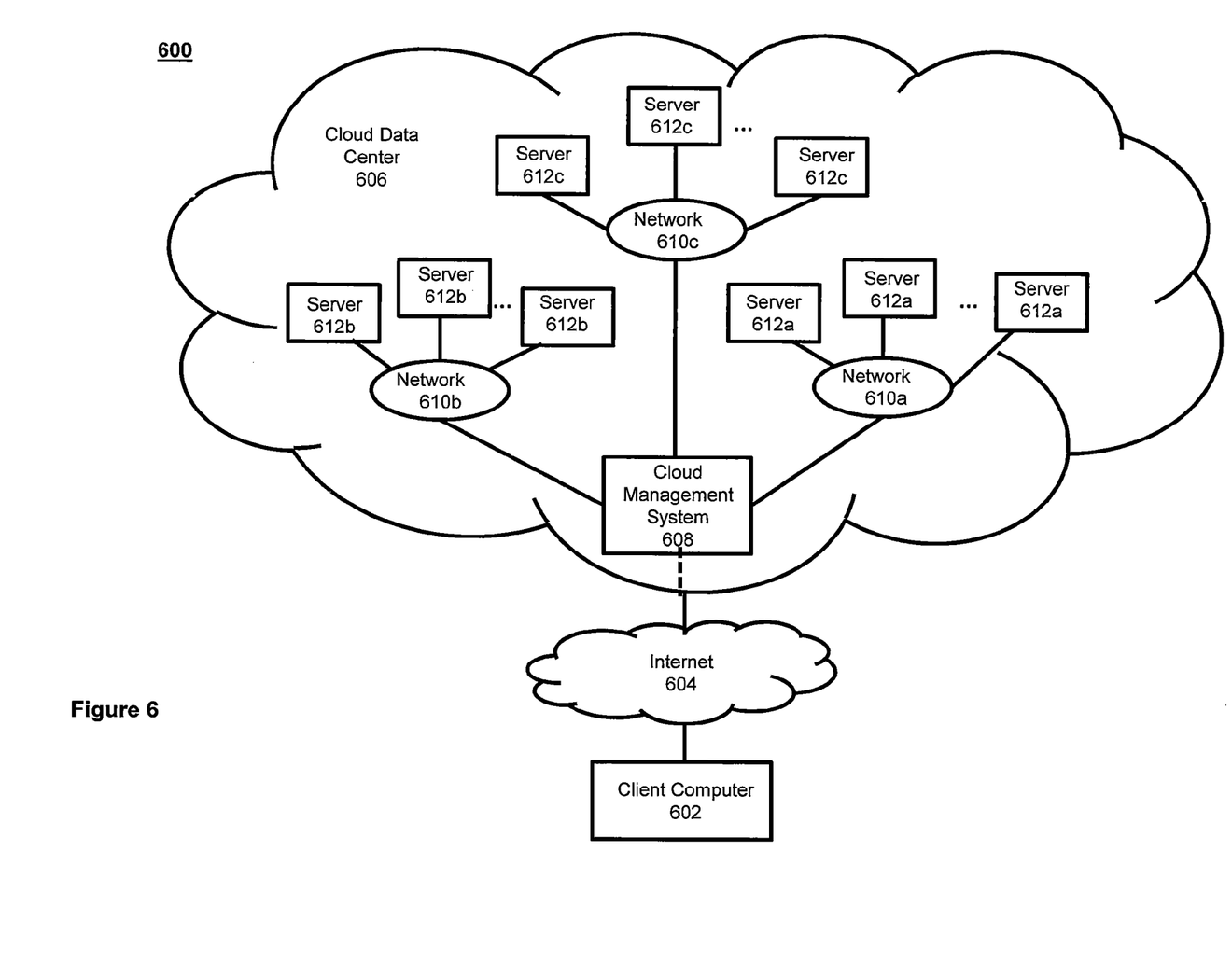
FIG. 6 illustrates an exemplary distributed computing environment that may be used to implement the methods according to the present invention.

FIG. 6 illustrates an exemplary distributed computing environment, specifically a cloud computing system 600 that may be used to implement the methods according to the present invention. The cloud computing system 600 includes a plurality of interconnected computing environments. The cloud computing system 600 utilizes the resources from various networks as a collective virtual computer, where the services and applications can run independently from a particular computer or server configuration making hardware less important.

Specifically, the cloud computing system 600 includes at least one client computer 602. The client computer may be any device through the use of which a distributed computing environment may be accessed to perform the methods disclosed herein, for example, a traditional computer, portable computer, mobile phone, personal digital assistant, tablet to name a few. The client computer 602 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 602 also includes a communications interface, for example, a modem, a network interface (such as an Ethernet card), a communications port, a PCMCIA slot and card, wired or wireless systems, etc. The communications interface allows communication through transferred signals between the client computer 602 and external devices including networks such as the Internet 604 and cloud data center 606. Communication may be implemented using wireless or wired capability such as cable, fiber optics, a phone line, a cellular phone link, radio waves or other communication channels.

The client computer 602 establishes communication with the Internet 604—specifically to one or more servers—to, in turn, establish communication with one or more cloud data centers 606. A cloud data center 606 includes one or more networks 610a, 610b, 610c managed through a cloud management system 608. Each network 610a, 610b, 610c includes resource servers 612a, 612b, 612c, respectively. Servers 612a, 612b, 612c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 608 can comprise a dedicated or centralized server and/or other software, hardware, and network tools to communicate with one or more networks 610a, 610b, 610c, such as the Internet or other public or private network, with all sets of resource servers 612a, 612b, 612c. The cloud management system 608 may be configured to query and identify the computing resources and components managed by the set of resource servers 612a, 612b, 612c needed and available for use in the cloud data center 606. Specifically, the cloud management system 608 may be configured to identify the hardware resources and components such as type and amount of processing power, type and amount of memory, type and amount of storage, type and amount of network bandwidth and the like, of the set of resource servers 612a, 612b, 612c needed and available for use in the cloud data center 606. Likewise, the cloud management system 608 can be configured to identify the software resources and components, such as type of Operating System ("OS"), application programs, and the like, of the set of resource servers 612a, 612b, 612c needed and available for use in the cloud data center 606.

The present invention is also directed to computer products, otherwise referred to as computer program products, to provide software to the cloud computing system 600. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 600 of FIG. 6 is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments thereof have been shown by way of example. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for mapping a data object in a key-value store within a distributed computing environment such that the data object can be retrieved using a search query, comprising the steps of:

dividing a hyperspace into regions to obtain a plurality of hyperspace regions;

distributing a plurality of storage nodes within the hyperspace;

assigning a hyperspace region to a storage node to obtain an assigned hyperspace region;

obtaining a plurality of data objects, each data object including one or more attribute values;

computing a coordinate for each data object, wherein the coordinate corresponds to the one or more attribute values of the data object;

mapping each data object to the storage node whose assigned hyperspace region encapsulates the coordinate for the data object;

storing each data object including the one or more attribute values on a computer readable memory of the data storage node;

reviewing a search query that includes a defined coordinate, wherein the defined coordinate corresponds to one or more specific attribute values of a desired data object;

searching the hyperspace for at least a portion of the defined coordinate to obtain a set of searched hyperspace regions;

finding an intersection of two or more searched hyperspace regions to obtain a query hyperregion;

determining a set of resultant data storage nodes of the query hyperregion, wherein each resultant data storage node of the set has an assigned hyperspace region that intersects the query hyperregion;

finding the one or more data objects within the set of resultant data storage nodes that corresponds to the search query to obtain one or more matched data objects;

retrieving the one or more matched data objects from the set of resultant data storage nodes to obtain a result; and communicating the result including one or more attribute values of each matched data object.

2. The method according to claim 1, wherein said computing step further comprises the step of hashing the one or more attribute values of the data object to compute the coordinate.

3. The method according to claim 1, wherein said computing step further comprises the step of calculating an order-preserving function of the one or more attribute values of the data object to compute the coordinate.

4. The method according to claim 1 wherein the hyperspace consists of three dimensions.

5. The method according to claim 4 wherein the hyperspace is a cube shape.

\* \* \* \* \*